US009288748B2

(12) United States Patent
Chin et al.

(10) Patent No.: US 9,288,748 B2
(45) Date of Patent: Mar. 15, 2016

(54) MEASUREMENT IN SIMULTANEOUS TDD-LTE AND TD-SCDMA/GSM SYSTEMS

(75) Inventors: Tom Chin, San Diego, CA (US); Guangming Shi, San Diego, CA (US); Kuo-Chun Lee, San Diego, CA (US); Thawatt Gopal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 600 days.

(21) Appl. No.: 13/224,055

(22) Filed: Sep. 1, 2011

(65) Prior Publication Data

US 2012/0257550 A1    Oct. 11, 2012

Related U.S. Application Data

(60) Provisional application No. 61/472,094, filed on Apr. 5, 2011.

(51) Int. Cl.
*H04W 48/18* (2009.01)
*H04W 24/10* (2009.01)
*H04W 88/06* (2009.01)

(52) U.S. Cl.
CPC .............. *H04W 48/18* (2013.01); *H04W 24/10* (2013.01); *H04W 88/06* (2013.01)

(58) Field of Classification Search
CPC ...... H04W 48/18; H04W 24/10; H04W 88/06
USPC ........... 370/252, 280, 328, 338; 455/450, 525
See application file for complete search history.

(56) References Cited

U.S. PATENT DOCUMENTS

| 2003/0153271 | A1  | 8/2003  | Brandt et al. |
| 2004/0204035 | A1  | 10/2004 | Raghuram et al. |
| 2005/0079870 | A1  | 4/2005  | Rick et al. |
| 2007/0218899 | A1* | 9/2007  | Kim .............................. 455/434 |
| 2008/0132232 | A1  | 6/2008  | Tomizu |
| 2009/0042601 | A1* | 2/2009  | Wang et al. ................. 455/553.1 |
| 2009/0275334 | A1* | 11/2009 | Xie et al. ....................... 455/436 |
| 2011/0207453 | A1* | 8/2011  | Hsu et al. ....................... 455/424 |

OTHER PUBLICATIONS

International Search Report and Written Opinion—PCT/US2011/053603—ISA/EPO—Dec. 23, 2011.

* cited by examiner

*Primary Examiner* — Pao Sinkantarakorn
*Assistant Examiner* — Richard Chang

(57) ABSTRACT

In a mobile device for wireless communication capable of communicating on multiple radio access technologies (RATs), cell selection may be improved by reusing cell measurements for inter-RAT cell selection. This will reduce the number of cell measurements taken and improve mobile device performance. A time threshold may be used to instigate new cell measurement to prevent cell measurement data from being outdated.

12 Claims, 10 Drawing Sheets

MEASUREMENT IN SIMULTANEOUS TDD-LTE AND TD-SCDMA/GSM SYSTEMS

CROSS REFERENCE TO RELATED APPLICATION

This application claims the benefit of U.S. provisional patent application No. 61/472,094 filed Apr. 5, 2011, in the names of CHIN et al., the disclosure of which is expressly incorporated herein by reference in its entirety.

BACKGROUND

1. Field

Aspects of the present disclosure relate generally to wireless communication systems, and more particularly, to an improved method of signal measurement in TDD-LTE (Time Division Long Term Evolution) and Time Division-Synchronous Code Division Multiple Access (TD-SCDMA)/Global System for Mobile Communications (GSM) networks.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

Figure 1:
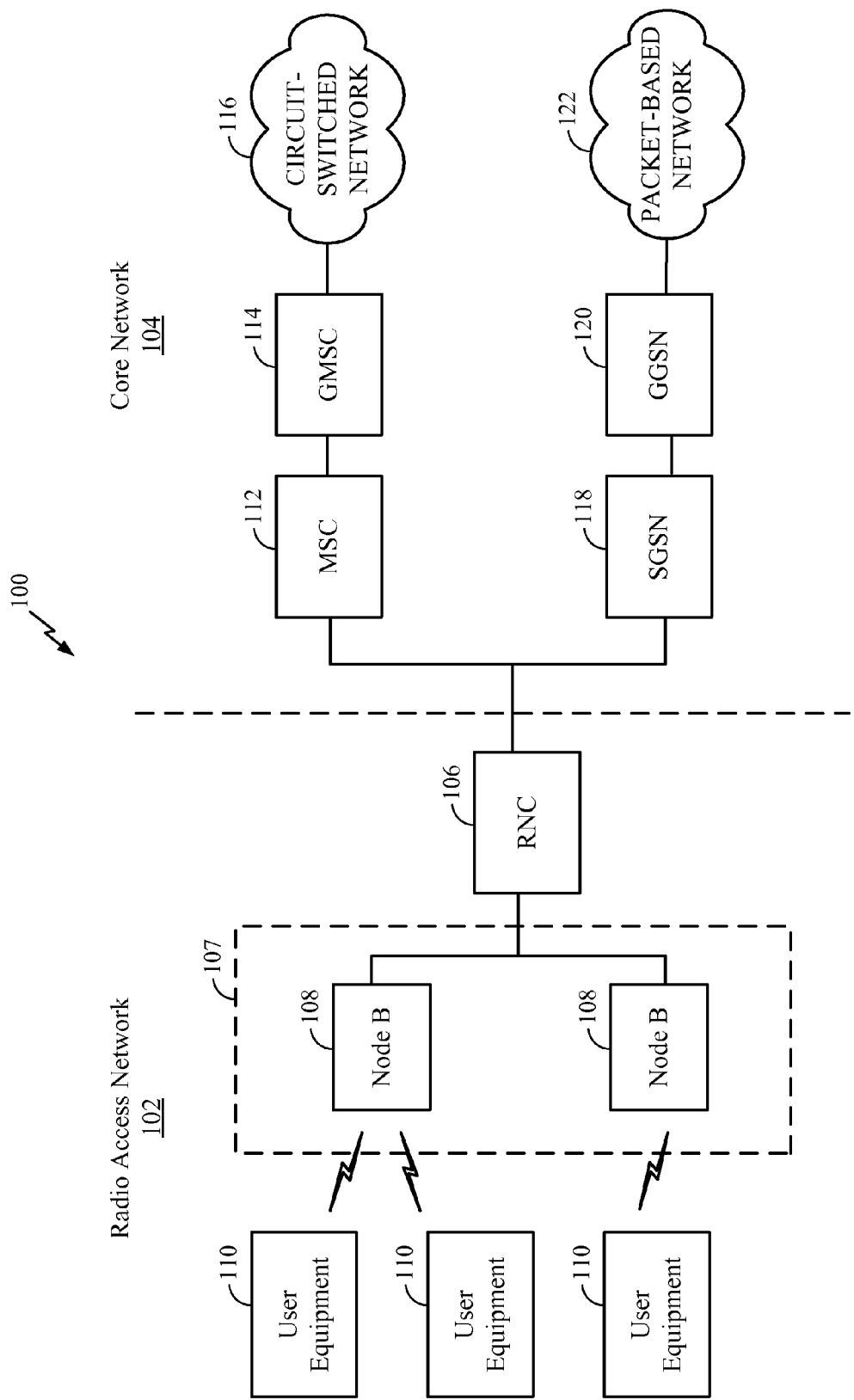
FIG. 1 is a block diagram conceptually illustrating an example of a telecommunications system.

Offered is a method for wireless communication. The method includes performing a signal measurement of a first radio access network at a first time following a paging occasion of the first radio access network. The method also includes performing a signal measurement of a second radio access network at a second time following a paging occasion of the second radio access network, the paging occasion of the second radio access network occurring after the first time. The method further includes performing cell reselection using the signal measurement of the first radio access network and the signal measurement of the second radio access network.

Offered is a user equipment configured for wireless communication. The user equipment includes means for performing a signal measurement of a first radio access network at a first time following a paging occasion of the first radio access network. The user equipment also includes means for performing a signal measurement of a second radio access network at a second time following a paging occasion of the second radio access network. The paging occasion of the second radio access network occurs after the first time. The user equipment further includes means for performing cell reselection using the signal measurement of the first radio access network and the signal measurement of the second radio access network.

Offered is a computer program product including a non-transitory computer-readable medium having program code recorded thereon. The program code includes program code to perform a signal measurement of a first radio access network at a first time following a paging occasion of the first radio access network. The program code also includes program code to perform a signal measurement of a second radio access network at a second time following a paging occasion of the second radio access network. The paging occasion of the second radio access network occurs after the first time. The program code further includes program code to perform cell reselection using the signal measurement of the first radio access network and the signal measurement of the second radio access network.

Offered is a user equipment configured for wireless communication. The user equipment includes a processor(s) and a memory coupled to the processor(s). The processor(s) is configured to perform a signal measurement of a first radio access network at a first time following a paging occasion of the first radio access network. The processor(s) is also configured to perform a signal measurement of a second radio access network at a second time following a paging occasion of the second radio access network. The paging occasion of the second radio access network occurs after the first time. The processor(s) is further configured to perform cell reselection using the signal measurement of the first radio access network and the signal measurement of the second radio access network.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
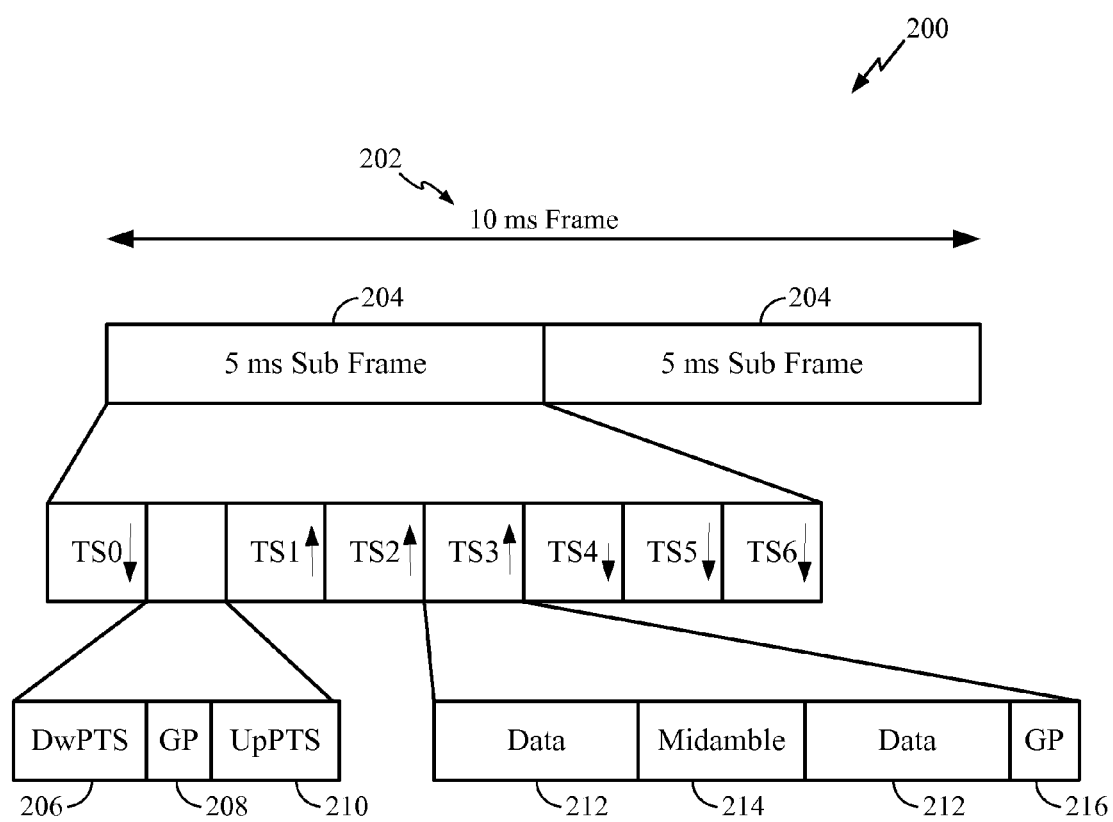
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. In the example illustrated, TS1-TS3 are allocated for uplink and TS4-TS6 are allocated for downlink. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference. The chip rate in TD-SCDMA is 1.28 Mcps.

Figure 3:
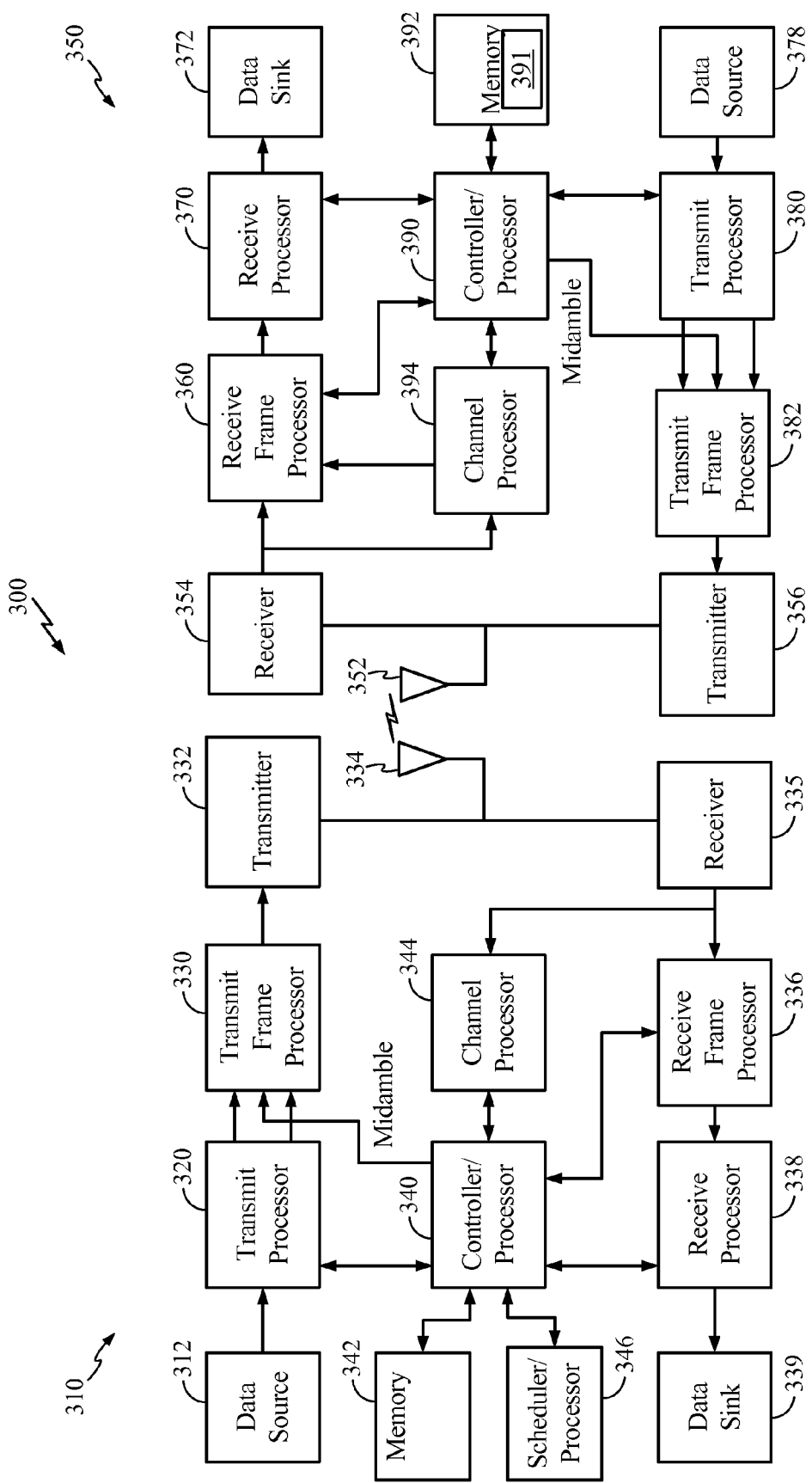
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store a signal measurement scheduling module 391 which, when executed by the controller/processor 390, configures the UE 350 for dual mode operation for signal measurement scheduling. A scheduler/processor 346 at the node B 310 may be used to allocate resources to the UEs and schedule downlink and/or uplink transmissions for the UEs.

Certain mobile equipment may be configured to allow for operation on multiple wireless communication networks. For example, a UE may be capable of operating either on a TD-SCDMA/GSM network or on a TDD-LTE (Time Division Duplexed-Long Term Evolution) network. Certain situations may direct the UE to communicate on one particular available network. For example, a multi-mode UE capable of communicating on either TD-SCDMA or on TDD-LTE may wish to connect to TDD-LTE for data service and to TD-SCDMA for voice service.

Figure 4:
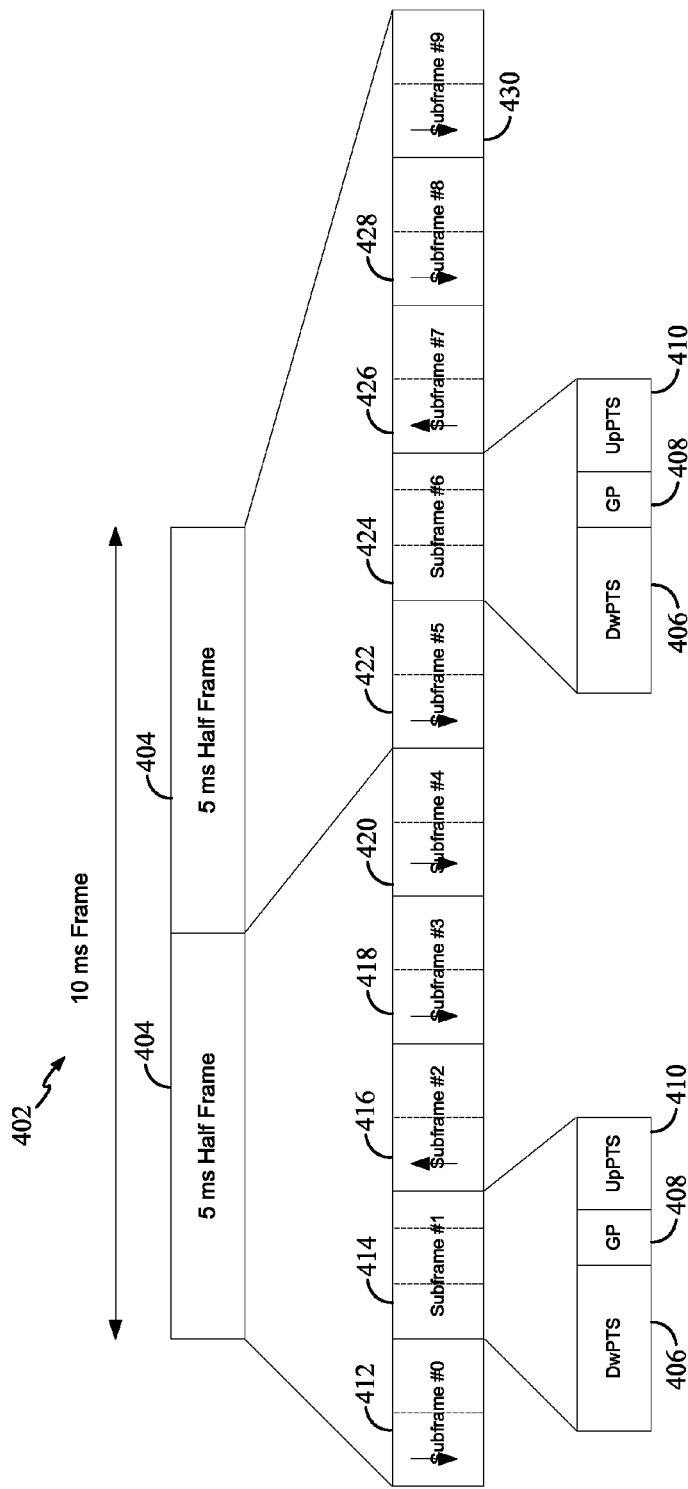
FIG. 4 is a block diagram conceptually illustrating an example of a frame structure in a telecommunications system.

FIG. 4 shows a frame structure for a TDD-LTE carrier. The TDD-LTE carrier, as illustrated, has a frame 402 that is 10 ms in length. Each radio frame has 307200 Ts, where T is the basic time unit of TDD-LTE. Each frame has two 5 ms half frames 404, and each of the half frames 404 includes five time subframes, giving each individual frame ten subframes, shown as subframes #0 through #9 (412-430). Each subframe can be either a downlink subframe (D), uplink subframe (U), or special subframe (S). Downlink subframes and uplink subframes can be divided into two slots, each of 0.5 ms. A special subframe may be divided into DwPTS (Downlink Pilot Timeslot), UpPTS (Uplink Pilot Timeslot), and gap period. Depending on configuration, the duration of DwPTS, UpPTS, and the gap period can vary.

As illustrated in FIG. 4, subframe #1 414 and subframe #6 424 are special subframes each with a DwPTS 406, gap period 408, and UpPTS 410. Subframes #0, 3, 4, 5, 8, and 9 (412, 418, 420, 422, 428, and 430) are downlink subframes and subframes #2 and 7 (416 and 426) are uplink subframes. This uplink-downlink configuration corresponds to TDD-LTE frame configuration 2. The following table shows the possible uplink-downlink configurations in TDD-LTE:

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 5:
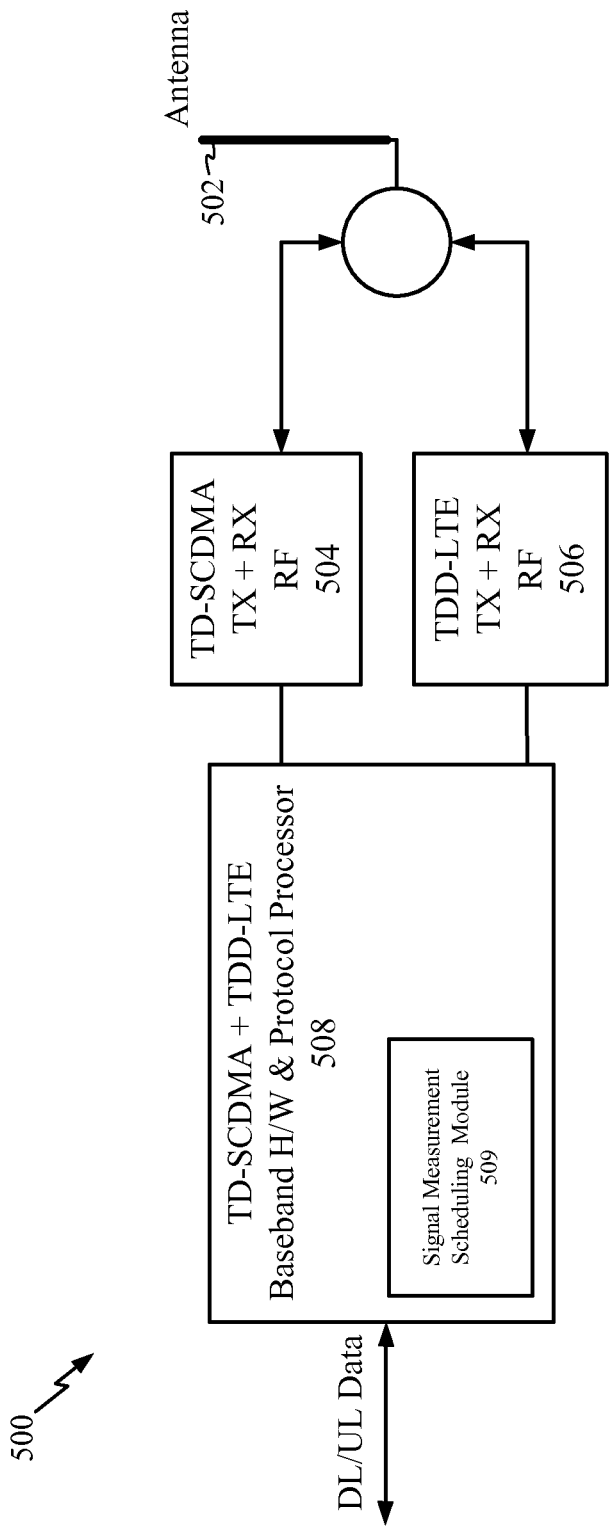
FIG. 5 is a block diagram illustrating a dual mode UE for implementing one aspect of the present disclosure.

Certain UEs may include dual mode hardware which enables simultaneous transmission and reception on two different radio access technologies (RATs). For example, a UE 500 employing the dual RF chain hardware of FIG. 5 may engage in simultaneous transmission and reception on different radio access technologies. As shown in FIG. 5, signals from and to any base station are received and transmitted by the UE through an antenna 502. The signals are then processed by one of the UE's dual hardware chains. Signals to/from a TD-SCDMA network may be handled by hardware of block 504. Signals to/from a TDD-LTE network may be handled by hardware of block 506. With the components shown in FIG. 5 a UE may be able to simultaneously transmit or receive with one network while also transmitting or receiving with the other network. The architecture of FIG. 5 may make use of application specific integrated circuits (ASICs). The architecture of FIG. 5 may allow simultaneous voice and data operations. For example, the TDD-LTE chain 506 may be used for packet-switched (PS) data transmission and the TD-SCDMA chain may be used for circuit-switched (CS) communications. A protocol processor 508 is provided to process the received and transmitted data. A signal measurement scheduling module 509 may be included within the TD-SCDMA and TDD-LTE baseband hardware/protocol processor 508. The signal measurement scheduling module 509 can be hardware, software, or any combination of the two. High level functionality of the signal measurement scheduling module 509 is now described with respect to FIG. 6.

Figure 6:
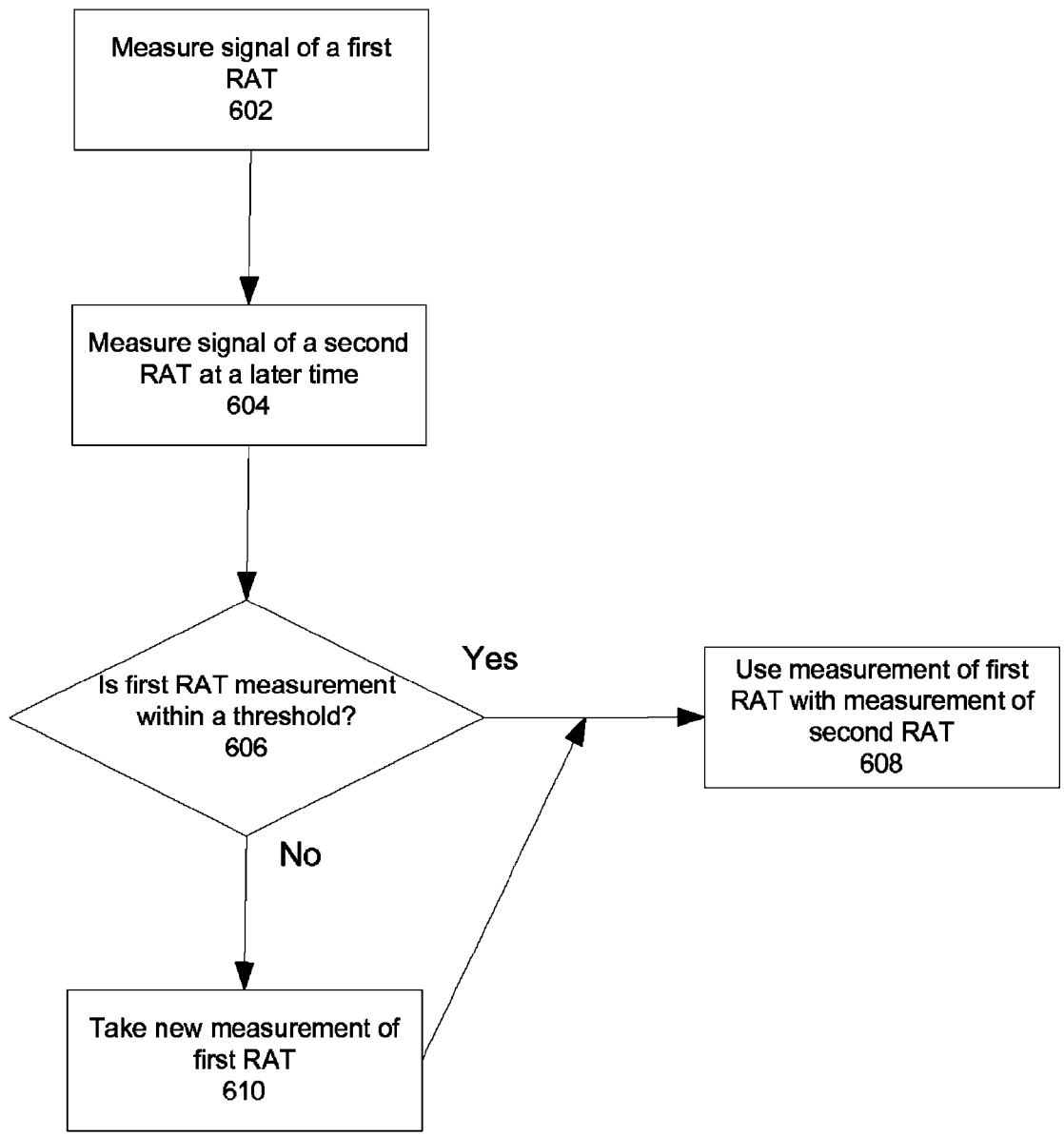
FIG. 6 is a flow diagram illustrating operation of a signal measurement scheduling module according to one aspect of the present disclosure.

As shown in block 602 of FIG. 6, the signal measurement scheduling module 509 measures a signal of a first radio access technology (RAT). The signal measurement scheduling module 509 later measures a signal of a second radio access technology, as shown in block 604. The signal measurement scheduling module 509 then compares the first RAT measurement with a time threshold, as shown in block 606. If the measurement of the first RAT is within the time threshold, the measurement of the first RAT is used with the measurement of the second RAT for cell reselection, as shown in block 608. If the measurement of the first RAT is beyond the time threshold, the signal measurement scheduling module 509 performs a new measurement of the first RAT, as shown in block 610. The new measurement of the first RAT is then used with the measurement of the second RAT for cell reselection, as shown in block 608.

When the UE is in idle mode, it may periodically perform signal measurement not only on its present radio access technology but also on other radio access technologies so the UE is properly prepared should the UE receive a mobile terminated packet-switched call (from either the TDD-LTE network or TD-SCDMA network) or a mobile terminated circuit-switched call (from the TD-SCDMA network). The UE may also perform signal measurement for potential cell reselection, where a measurement result may indicate a neighboring cell provides better signal strength/connection performance. Cell reselection may occur within a radio access technology (i.e. the UE is switching to monitor a different TDD-LTE cell) or across radio access technologies (i.e. the UE is switching to monitor a cell on the TD-SCDMA network when it previously monitored a TDD-LTE cell).

Typically, signal measurement of another RAT is performed at the end of a paging occasion. In TD-SCDMA, this may mean at the end of monitoring a Paging Indicator Channel (PICH) or Paging Channel (PCH). In TDD-LTE, it may mean at the end of monitoring the paging subframe. For simultaneous operation in TDD-LTE and TD-SCDMA, it may imply that at the end of the TDD-LTE paging occasion, the UE may perform a TD-SCDMA measurement in addition to the TDD-LTE measurement.

Figure 7:
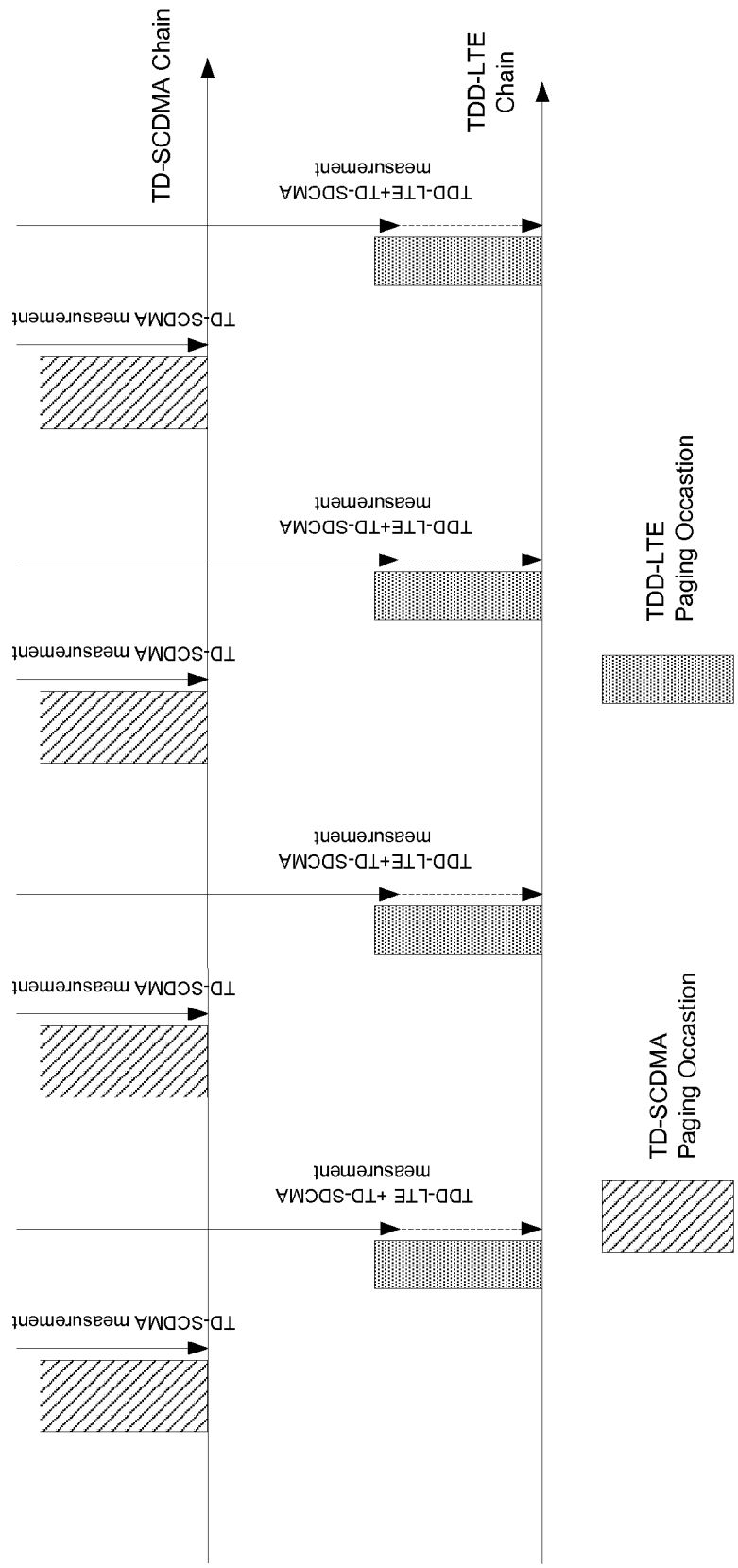
FIG. 7 illustrates a measurement timetable for simultaneous operation in TDD-LTE and TD-SCDMA.

FIG. 7 shows a measurement time schedule for a UE which employs simultaneous operation in TDD-LTE and TD-SCDMA. At the end of a TD-SCDMA paging occasion, there is no measurement of the TDD-LTE network because circuit-switching service is only offered by the TD-SCDMA network, whereas packet-switching services can be offered by both TD-SCDMA and TDD-LTE networks. This is because if the UE measures the TDD-LTE network, a further measurement of the TD-SCDMA network is taken to account for circuit-switching operation, whereas if a measurement of the TD-SCDMA network is taken, no further measurements occur because both circuit-switching operation and packet-switching operation are accounted for. Thus, if a UE finds a TD-SCDMA cell that provides a better signal than a TDD-LTE cell, the UE can move its packet-switched service from TDD-LTE to TD-SCDMA. This is not possible with circuit-switched service because TDD-LTE does not support circuit-switched service.

This measurement scheme is not as efficient as it could be because more measurements than needed may be performed. For example, more than one TD-SCDMA measurement may be taken for each TD-SCDMA discontinuous reception cycle.

Figure 8:
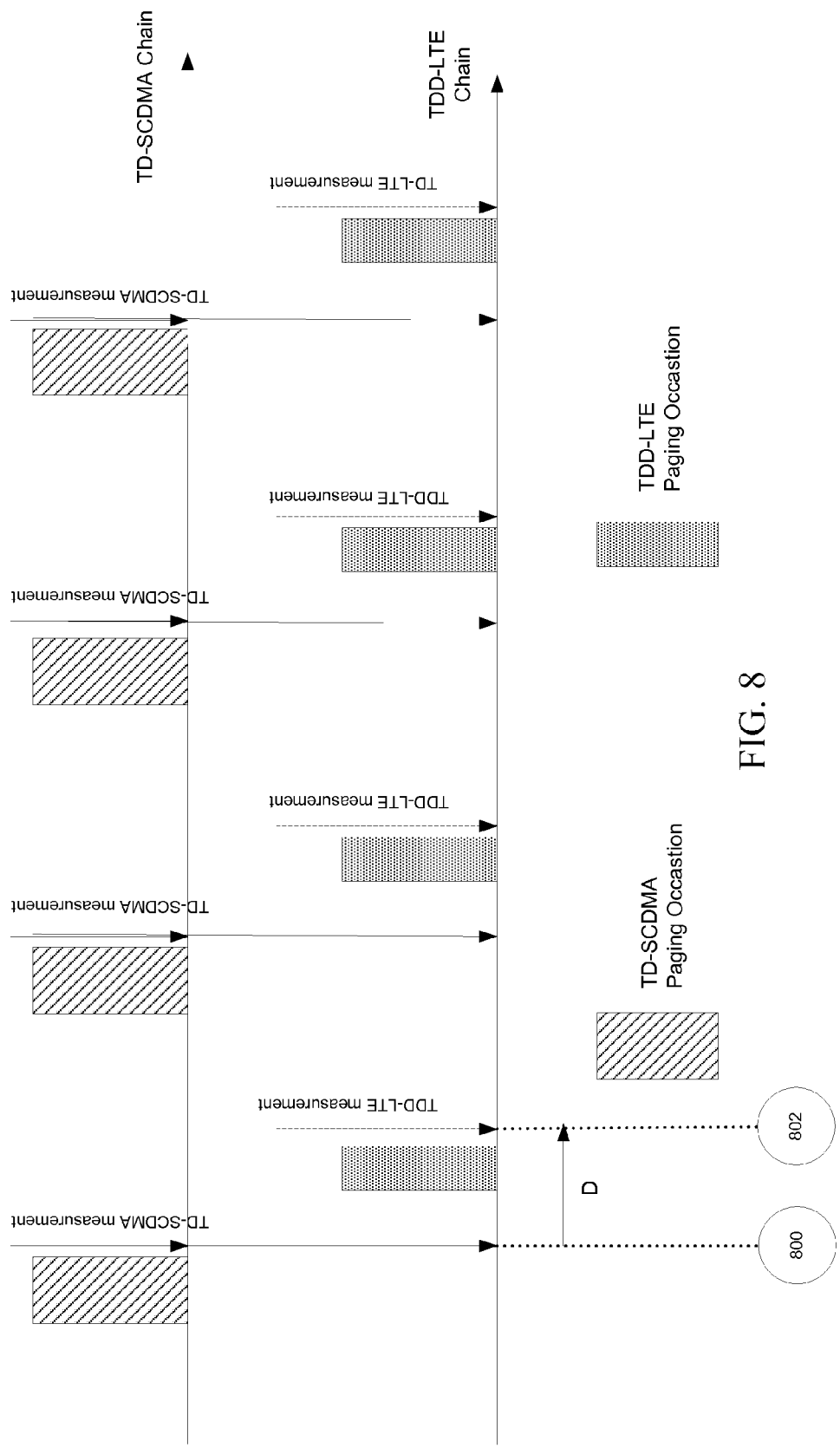
FIG. 8 illustrates a measurement timetable for simultaneous operation in TDD-LTE and TD-SCDMA according to one aspect of the present disclosure.

Offered is an improved method of TD-SCDMA measurement by reusing the TD-SCDMA measurement at the end of a TD-SCDMA paging occasion. FIG. 8 shows such an improved method. As shown in FIG. 8, a measurement of TD-SCDMA is taken at time 800. At time 802, a TDD-LTE measurement occurs. Instead of also taking a new TD-SCDMA measurement at time 802, the TD-SCDMA measurement from time 800 is used for inter-RAT cell reselection. This may result in the TD-SCDMA measurement not being as recent (for example the measurement data is delayed by time D), but reusing the TD-SCDMA measurement data in this manner will reduce the number of TD-SCDMA measurements taken for inter-RAT cell reselection. To prevent the TD-SCDMA data from becoming too old, a time threshold may be used such that if time D reaches a certain point, new TD-SCDMA measurements are taken. Use of this threshold is explained above in reference to FIG. 6. The time threshold may vary depending on the scheduling of paging occasions in TD-SCDMA and TDD-LTE systems. The proposed method may allow the UE to avoid undesired signal measurement and save battery power in the dual mode architectures.

To conform to network instructions, the UE may perform TD-SCDMA measurement on neighboring cells as indicated in System Information broadcasted by the TD-SCDMA Node B and in the System Information broadcasted by the TDD-LTE eNode B (evolved Node B). The System Information of the different networks may indicate when the UE is to perform certain measurements. The UE may take the System Information of the networks into account when determining when to skip measurements of the TD-SCDMA network.

Although the description above references simultaneous operation between a TD-SCDMA network and TDD-LTE network, the teachings may also apply to simultaneous operation between a GSM network and TDD-LTE network as a GSM network may also offer a packet-switching and circuit-switching service.

In one configuration, the apparatus, for example the UE 350, for wireless communication includes means for performing a signal measurement of a first radio access network at a first time following a paging occasion of the first radio access network, means for performing a signal measurement of a second radio access network at a second time following a paging occasion of the second radio access network, the paging occasion of the second radio access network occurring after the first time, and means for performing cell selection using the signal measurement of the first radio access network and the signal measurement of the second radio access network. In one aspect, the aforementioned means may be the antennas 352 or 502, the transmit/receive hardware 504 or 506, the signal measurement scheduling module 509, the protocol processor 508, the receiver 354, the channel processor 394, the receive frame processor 360, the receive processor 370, the transmitter 356, the transmit frame processor 382, the transmit processor 380, the controller/processor 390, the memory 392, and the signal measurement scheduling module 391 configured to perform the functions recited by the aforementioned means. In another aspect, the aforementioned means may be a module or any apparatus configured to perform the functions recited by the aforementioned means.

Figure 9:
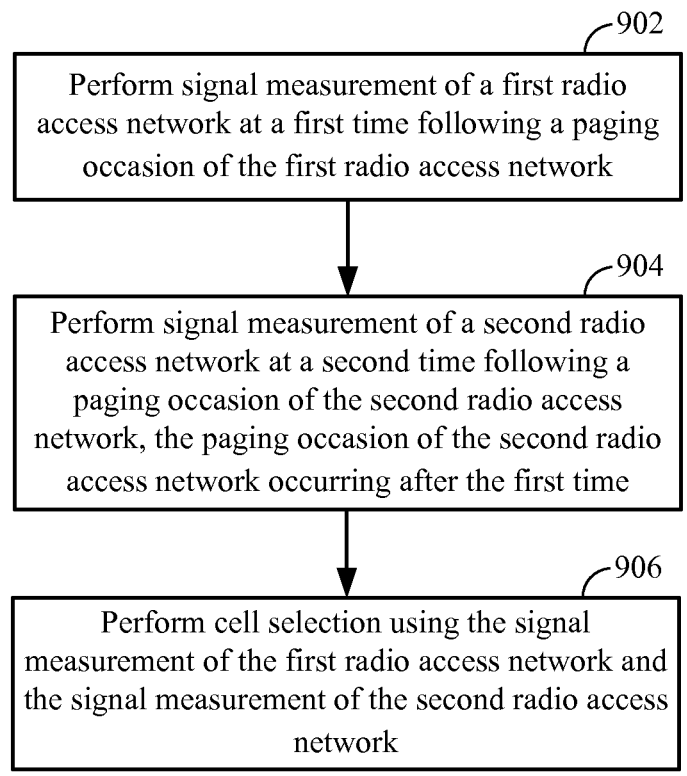
FIG. 9 is a functional block diagram illustrating example blocks executed to implement one aspect of the present disclosure.

As shown in FIG. 9 a UE may perform a signal measurement of a first radio access network at a first time following a paging occasion of the first radio access network, as shown in block 902. The UE may perform a signal measurement of a second radio access network at a second time following a paging occasion of the second radio access network. The paging occasion of the second radio access network occurs after the first time, as shown in block 904. The UE may also perform cell selection using the signal measurement of the first radio access network and the signal measurement of the second radio access network, as shown in block 906.

Figure 10:
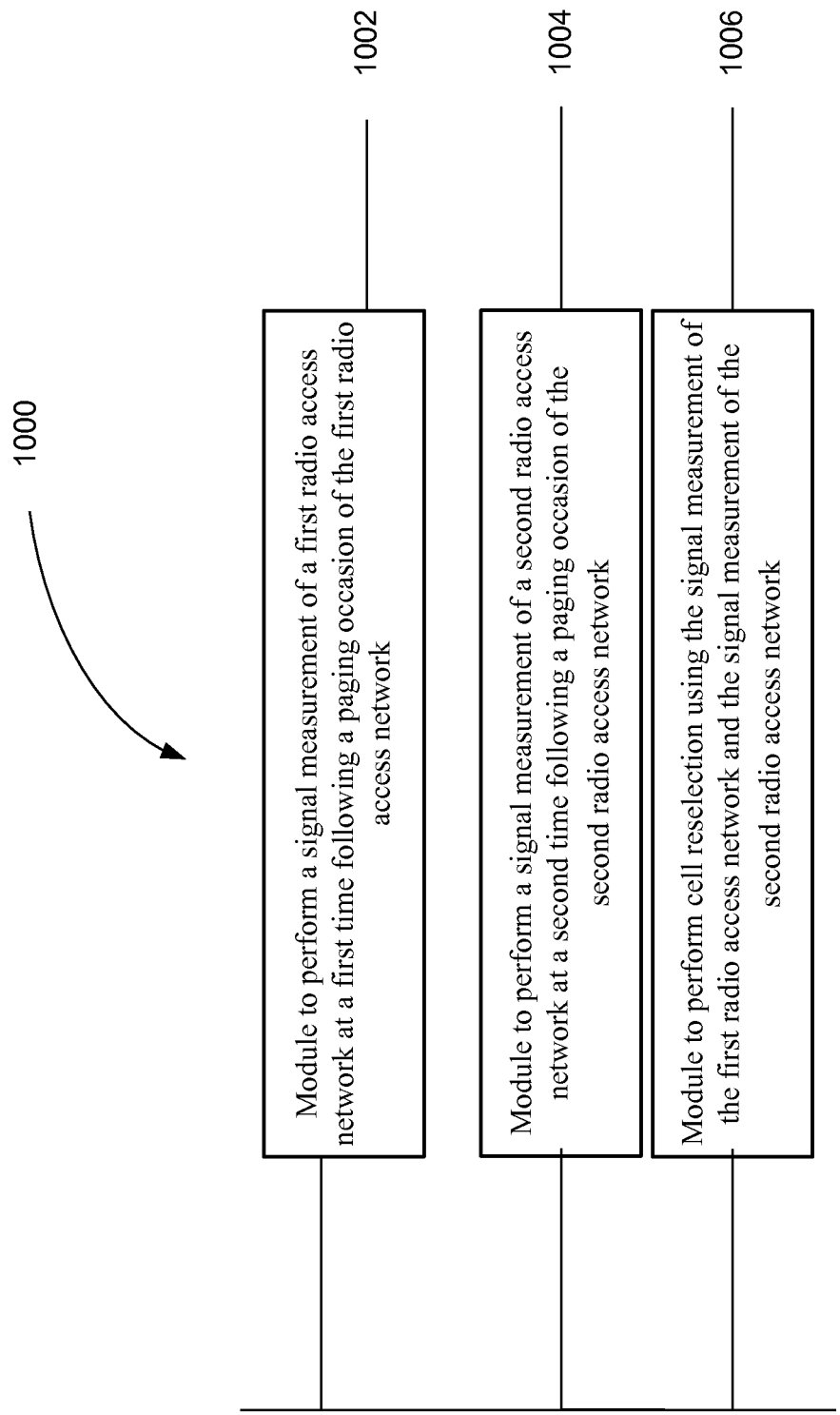
FIG. 10 is a block diagram illustrating components to implement one aspect of the present disclosure.

FIG. 10 shows a design of an apparatus 1000 for a UE, such as the UE 350 of FIG. 3. The apparatus 1000 includes a module 1002 to perform a signal measurement of a first radio access network at a first time following a paging occasion of the first radio access network. The apparatus also includes a module 1004 to perform a signal measurement of a second radio access network at a second time following a paging occasion of the second radio access network. The paging occasion of the second radio access network occurs after the first time. The apparatus also includes a module 1006 to perform cell reselection using the signal measurement of the first radio access network and the signal measurement of the second radio access network. The modules in FIG. 10 may be processors, electronics devices, hardware devices, electronics components, logical circuits, memories, software codes, firmware codes, etc., or any combination thereof.

Several aspects of a telecommunications system has been presented with reference to TD-SCDMA and TDD-LTE systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing FDD Long Term Evolution (LTE), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication, comprising:
   performing a signal measurement of a first radio access network at a first time following a paging occasion of the first radio access network;
   performing a signal measurement of a second radio access network at a second time following a paging occasion of the second radio access network, the paging occasion of the second radio access network occurring after the first time;
   determining when a time period between the first time following the paging occasion of the first radio access technology and the second time following the paging occasion of the second radio access technology is less than a determined threshold for determining whether to perform a new signal measurement of the first radio access technology;
   performing cell reselection using the signal measurement of the first radio access network and the signal measurement of the second radio access network in response to the time period being less than the determined threshold;
   performing a new signal measurement of the first radio access network when the time period between the first time and the second time is greater than the determined threshold; and
   performing cell reselection using the new signal measurement of the first radio access network in response to the time period being greater than the determined threshold.

2. The method of claim 1 further comprising connecting to a new cell based on the performed cell reselection.

3. The method of claim 1 in which the first radio access network comprises a time division-synchronous code division multiple access (TD-SCDMA) network and the second radio access network comprises a time division duplexed-Long Term Evolution (TDD-LTE) network.

4. A user equipment configured for wireless communication, the comprising:
   means for performing a signal measurement of a first radio access network at a first time following a paging occasion of the first radio access network;
   means for performing a signal measurement of a second radio access network at a second time following a paging occasion of the second radio access network, the paging occasion of the second radio access network occurring after the first time;
- means for determining when a time period between the first time following the paging occasion of the first radio access technology and the second time following the paging occasion of the second radio access technology is less than a determined threshold for determining whether to perform a new signal measurement of the first radio access technology;
- means for performing cell reselection using the signal measurement of the first radio access network and the signal measurement of the second radio access network in response to the time period being less than the determined threshold;
- means for performing a new signal measurement of the first radio access network when the time period between the first time and the second time is greater than the determined threshold; and
- means for performing cell reselection using the new signal measurement of the first radio access network in response to the time period being greater than the determined threshold.

5. The user equipment of claim 4 further comprising means for connecting to a new cell based on the performed cell reselection.

6. The user equipment of claim 4 in which the first radio access network comprises a time division-synchronous code division multiple access (TD-SCDMA) network and the second radio access network comprises a time division duplexed-Long Term Evolution (TDD-LTE) network.

7. A non-transitory computer-readable medium having program code recorded thereon, the program code comprising:
- program code to perform a signal measurement of a first radio access network at a first time following a paging occasion of the first radio access network;
- program code to perform a signal measurement of a second radio access network at a second time following a paging occasion of the second radio access network, the paging occasion of the second radio access network occurring after the first time;
- program code to determine when a time period between the first time following the paging occasion of the first radio access technology and the second time following the paging occasion of the second radio access technology is less than a determined threshold for determining whether to perform a new signal measurement of the first radio access technology;
- program code to perform cell reselection using the signal measurement of the first radio access network and the signal measurement of the second radio access network in response to the time period being less than the determined threshold;
- program code to perform a new signal measurement of the first radio access network when the time period between the first time and the second time is greater than the determined threshold; and
- program code to perform cell reselection using the new signal measurement of the first radio access network in response to the time period being greater than the determined threshold.

8. The non-transitory computer-readable medium of claim 7 in which the program code further comprises program code to connect to a new cell based on the performed cell reselection.

9. The non-transitory computer-readable medium of claim 7 in which the first radio access network comprises a time division-synchronous code division multiple access (TD-SCDMA) network and the second radio access network comprises a time division duplexed-Long Term Evolution (TDD-LTE) network.

10. A user equipment configured for wireless communication, comprising:
- at least one processor; and
- a memory coupled to said at least one processor,
- wherein said at least one processor is configured:
    - to perform a signal measurement of a first radio access network at a first time following a paging occasion of the first radio access network;
    - to perform a signal measurement of a second radio access network at a second time following a paging occasion of the second radio access network, the paging occasion of the second radio access network occurring after the first time;
    - to determine when a time period between the first time following the paging occasion of the first radio access technology and the second time following the paging occasion of the second radio access technology is less than a determined threshold for determining whether to perform a new signal measurement of the first radio access technology;
    - to perform cell reselection using the signal measurement of the first radio access network and the signal measurement of the second radio access network in response to the time period being less than the determined thresholds;
    - to perform a new signal measurement of the first radio access network when the time period between the first time and the second time is greater than the determined threshold; and
    - to perform cell reselection using the new signal measurement of the first radio access network in response to the time period being greater than the determined threshold.

11. The user equipment of claim 10 in which the at least one processor is further configured to connect to a new cell based on the performed cell reselection.

12. The user equipment of claim 10 in which the first radio access network comprises a time division-synchronous code division multiple access (TD-SCDMA) network and the second radio access network comprises a time division duplexed-Long Term Evolution (TDD-LTE) network.

* * * * *